US010978700B2

(12) United States Patent
Yu et al.

(10) Patent No.: US 10,978,700 B2
(45) Date of Patent: Apr. 13, 2021

(54) YOLK-SHELL NANOPARTICLE, METHOD AND APPLICATIONS

(71) Applicant: CORNELL UNIVERSITY, Ithaca, NY (US)

(72) Inventors: Yingchao Yu, Ithaca, NY (US); Weidong Zhou, Ithaca, NY (US); Hao Chen, Ithaca, NY (US); Hector D. Abruna, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 16/806,529

(22) Filed: Mar. 2, 2020

(65) Prior Publication Data

US 2020/0343538 A1 Oct. 29, 2020

Related U.S. Application Data

(63) Continuation of application No. 15/691,112, filed on Aug. 30, 2017, now Pat. No. 10,593,938, which is a
(Continued)

(51) Int. Cl.
*H01M 4/04* (2006.01)
*H01M 4/134* (2010.01)
(Continued)

(52) U.S. Cl.
CPC ......... *H01M 4/366* (2013.01); *H01M 4/0404* (2013.01); *H01M 4/134* (2013.01);
(Continued)

(58) Field of Classification Search
CPC .... H01M 4/0404; H01M 4/134; H01M 4/136; H01M 4/1395; H01M 4/1397;
(Continued)

(56) References Cited

U.S. PATENT DOCUMENTS 7,381,465 B2 6/2008 Tsukasa Tormioto et al.
2006/0019168 A1 1/2006 Li et al.
(Continued)

FOREIGN PATENT DOCUMENTS

WO 2014074150 5/2014

OTHER PUBLICATIONS

International Search Report and Written Opinion Form PCT/ISA/220, International Application No. PCT/US2014/045573, p. 1-15, International Filing Date Jul. 7, 2014, Search Report dated Jan. 15, 2015.

*Primary Examiner* — Brittany L Raymond
(74) *Attorney, Agent, or Firm* — Bond, Schoeneck & King, PLLC; Blaine Bettinger

(57) ABSTRACT

A nanoparticle and a method for fabricating the nanoparticle utilize a decomposable material yoke located within permeable organic polymer material shell and separated from the permeable organic polymer material shell by a void space. When the decomposable material yoke comprises a sulfur material and the permeable organic polymer material shell comprises a material permeable to both a sulfur material vapor and a lithium ion within a battery electrolyte the nanoparticle may be used within an electrode for a Li/S battery absent the negative effects of battery electrode materials expansion.

36 Claims, 9 Drawing Sheets

Related U.S. Application Data continuation of application No. 14/900,312, filed as application No. PCT/US2014/045573 on Jul. 7, 2014, now abandoned.

(60) Provisional application No. 61/843,133, filed on Jul. 5, 2013.

(51) Int. Cl.

| | | |
|---|---|---|
| *H01M 4/136* | (2010.01) | |
| *H01M 4/1395* | (2010.01) | |
| *H01M 4/1397* | (2010.01) | |
| *H01M 4/36* | (2006.01) | |
| *H01M 4/38* | (2006.01) | |
| *H01M 4/58* | (2010.01) | |
| *H01M 4/60* | (2006.01) | |
| *H01M 10/052* | (2010.01) | |
| *H01M 10/0525* | (2010.01) | |

(52) U.S. Cl.
CPC ......... *H01M 4/136* (2013.01); *H01M 4/1395* (2013.01); *H01M 4/1397* (2013.01); *H01M 4/38* (2013.01); *H01M 4/5815* (2013.01); *H01M 4/602* (2013.01); *H01M 10/052* (2013.01); *H01M 10/0525* (2013.01); *Y02T 10/70* (2013.01)

(58) Field of Classification Search
CPC ...... H01M 4/366; H01M 4/38; H01M 4/5815; H01M 4/602; H01M 10/052; H01M 10/0525; Y02E 60/10; Y02T 10/70
See application file for complete search history.

(56) References Cited

U.S. PATENT DOCUMENTS

| | | | |
|---|---|---|---|
| 2011/0091788 A1 | 4/2011 | Ziser et al. | |
| 2013/0065128 A1* | 3/2013 | Li | H01G 11/24 |
| | | | 429/218.1 |
| 2013/0330619 A1* | 12/2013 | Archer | H01M 10/052 |
| | | | 429/213 |

* cited by examiner

US 10,978,700 B2

YOLK-SHELL NANOPARTICLE, METHOD AND APPLICATIONS

CROSS-REFERENCE TO RELATED APPLICATION

This application is a continuation of co-pending U.S. patent application Ser. No. 15/691,112, filed Aug. 30, 2017, which is a continuation of U.S. patent application Ser. No. 14/900,312, filed Dec. 21, 2015, which claims benefit of International Patent Application No. PCT/US2014/045573 filed Jul. 7, 2014, which itself claims the benefit of U.S. Provisional Patent Application Ser. No. 61/843,133, filed Jul. 5, 2013, the content of each of which is incorporated herein fully by reference.

STATEMENT OF GOVERNMENT INTEREST

This invention was made with government support under Grant Numbers DE-FG02-87ER45298 & DE-SC0001086 awarded by the United States Department of Energy and Grant Number 1120296 awarded by the National Science Foundation. The Government has certain rights in the invention.

BACKGROUND

Field of the Invention

Embodiments relate generally to lithium-sulfur batteries. More particularly embodiments relate to lithium-sulfur batteries with enhanced performance.

Description of the Related Art

The widespread usage of portable electronic devices and the rapid growth of electric vehicles require the development of next-generation batteries with a higher energy capacity and a higher energy density. Among all rechargeable batteries, the lithium-sulfur (Li/S) cell is one of the most promising candidates due to: (1) a high theoretical energy capacity; (2) a low fabrication cost; and (3) an environmentally benign construction.

Despite these advantages, the practical application of Li/S cells is still limited due mainly to: (1) a low conductivity of sulfur; (2) a dissolution of polysulfides and a resulting shuttling effect in a charge-discharge process; and (3) a volumetric expansion during a discharge of the cell. Of the foregoing deficiencies, the dissolution of polysulfides is generally regarded as the most difficult problem to overcome, although the three issues often accompany each other.

Thus, desirable are methods and materials that provide Li/S batteries with enhanced performance.

SUMMARY

In accordance with the above, embodiments provide a nanoparticle in the form of a yoke-shell nanoparticle, as well as a method for fabricating the nanoparticle in the form of the yoke-shell nanoparticle. Embodiments also provide an electrode that includes the nanoparticle, as well as a battery than includes the electrode that includes the nanoparticle.

Within the embodiments, the form of the yoke-shell nanoparticle includes a void space interposed between a yoke and a permeable organic polymer material shell that surrounds the yoke. The void space accommodates materials expansion (i.e., generally but not limited to cathodic materials) when operating the battery. Thus, a battery that includes an electrode that includes a nanoparticle in accordance with the embodiments is prone to superior performance since materials expansion issues are addressed when operating the battery.

Within the context of the embodiments as disclosed and the invention as claimed, a "decomposable material yoke" is intended generally but not exclusively as a thermally decomposable material yoke (i.e., a sulfur material which is thermally decomposable to form a sulfur material vapor).

Within the context of the embodiments as disclosed and the invention as claimed, a "permeable organic polymer shell" is intended as permeable to a decomposed decomposable material yoke (i.e., a sulfur material vapor) and a lithium ion (or potentially other metal ions), but not an undecomposed decomposable material yoke.

A particular nanoparticle in accordance with the embodiments includes a decomposable material yoke. The particular nanoparticle also includes a permeable organic polymer material shell surrounding the decomposable material yoke. The particular nanoparticle also includes a void space interposed between the decomposable material yoke and the permeable organic polymer material shell.

A particular electrode in accordance with the embodiments includes a conductive substrate. The electrode also includes a coating located upon the conductive substrate. The coating includes a nanoparticle comprising: (1) a sulfur material yoke; (2) a lithium ion permeable organic polymer material shell surrounding the sulfur material yoke; and (3) a void space interposed between the sulfur material yoke and the lithium ion permeable organic polymer material shell.

A battery in accordance with the embodiments includes an electrode comprising: (1) a conductive substrate; and (2) a coating located upon the conductive substrate. The coating includes a nanoparticle comprising: (1) a sulfur material yoke; (2) a lithium ion permeable organic polymer material shell surrounding the sulfur material yoke; and (3) a void space interposed between the sulfur material yoke and the lithium ion permeable organic polymer material shell.

A method for fabricating a nanoparticle in accordance with the embodiments includes forming surrounding and contacting a decomposable material core a permeable organic polymer material shell. The method also includes decomposing part of the decomposable material core within the permeable organic polymer material shell to provide a partially decomposed decomposable material yoke within the permeable organic polymer material shell and separated from the permeable organic polymer material shell by a void space.

BRIEF DESCRIPTION OF THE DRAWINGS

The objects, features and advantages of the embodiments are understood within the context of the Detailed Description of the Non-Limiting Embodiments, as set forth below. The Detailed Description of the Non-Limiting Embodiments is understood within the context of the accompanying drawings, that form a material part of this disclosure, wherein.

DETAILED DESCRIPTION OF THE NON-LIMITING EMBODIMENTS

1. General Principle

Figure 1:
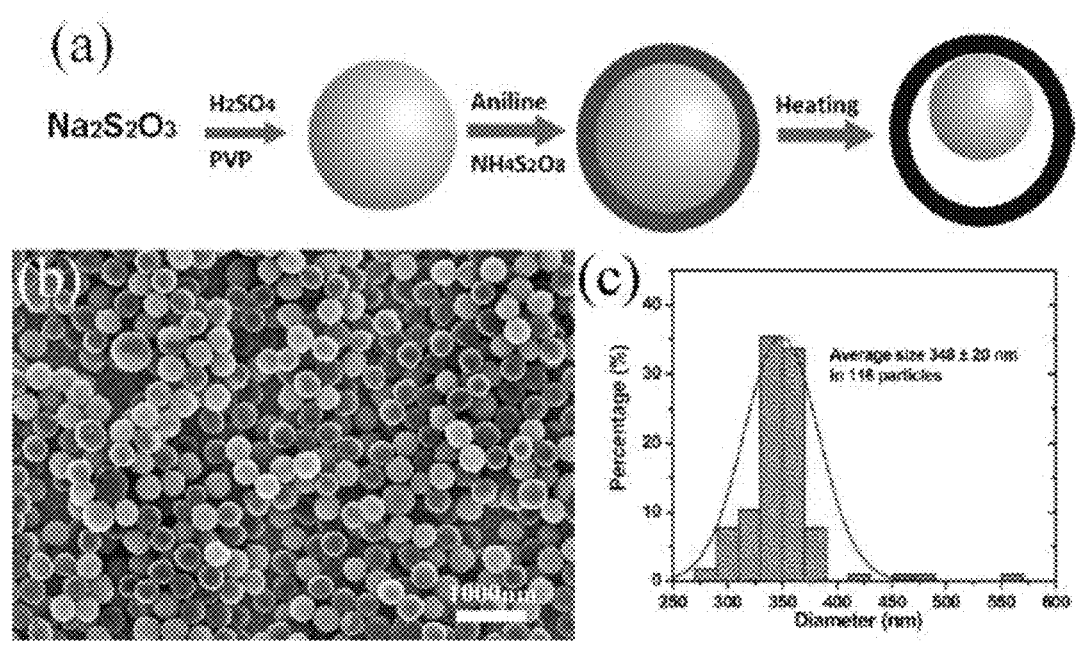
FIG. 1 shows: (a) two-step synthesis route for a S-Pani composite, with the yellow (i.e., lighter in grayscale) sphere representing sulfur, the dark green (i.e., intermediate in grayscale) shell representing polyaniline, and the black shell representing vulcanized polyaniline; (b) SEM images of the S-Pani core-shell composite using $H_2SO_4$ as the acid source; and (c) the particle size distribution.

Most generally, the embodiments provide a nanoparticle and a related method for fabricating the nanoparticle. A nanoparticle in accordance with the embodiments is in the form of a yoke-shell nanoparticle and includes: (1) a decomposable material yoke; (2) a permeable organic polymer material shell surrounding the decomposable material yoke; and (3) a void space interposed between the decomposable material yoke and the permeable organic polymer material shell surrounding the yoke.

The embodiments realize the foregoing nanoparticle within the context of the related method which in turn provides for forming a permeable organic polymer material shell upon and contacting a decomposable material core. The embodiments next provide for decomposing a portion of the decomposable material core to provide a decomposed material that escapes from the permeable organic polymer material shell and leaves behind a partially decomposed material yoke separated at least in part from the permeable organic polymer material shell by a void space.

This resulting nanoparticle when comprising a sulfur partially decomposed material yoke and a polyaniline permeable organic polymer material shell is useful within a lithium-sulfur battery since the void space allows for avoidance of mechanical stresses associated with volumetric expansion of an electrode that comprises a sulfur material within the context of the lithium-sulfur battery.

Within the context of the embodiments with respect to the lithium-sulfur battery, the decomposable material yoke may comprises a sulfur material selected from the group including but not limited to elemental sulfur, S8 and other polysulfides.

Within the context of the embodiments with respect to the lithium-sulfur battery, the permeable organic polymer material shell may comprise an organic polymer material selected from the group consisting of polyaniline permeable organic polymer materials and any other organic polymer capable of providing a permeable shell within the context of lithium ion transport and sulfur material vapor transport as discussed further below.

Within the context of the embodiments with respect to the lithium-sulfur battery: (1) the decomposable material yoke may comprise a sulfur material; and (2) the permeable organic polymer material shell may comprise a polyaniline material.

Within the context of the embodiments with respect to the lithium-sulfur battery: (1) the decomposable material yoke may have a diameter from about 200 to about 300 nanometers; and (2) the permeable organic polymer material shell may have a diameter from about 300 to about 400 nanometers and a thickness from about 10 to about 20 nanometers.

Within the context of the embodiments with respect to the lithium-sulfur battery, the void space interposed at least in-part between the decomposable material yoke and the permeable organic polymer material shell comprises from about 25 to about 50 percent (or alternatively from about 25 to about 75 percent) of the volume enclosed by the permeable organic polymer material shell.

Within the context of the embodiments with respect to the lithium-sulfur battery, a sulfur material yoke within a yoke-shell nanoparticle is formed incident to partial thermal decomposition of a sulfur material core within a core-shell nanoparticle at a temperature from about 150 to about 200 degrees centigrade for a time period from about 6 to about 18 hours.

2. Specific Application to S-Pani Yoke-Shell Nanoparticle and Li/S Battery

Within the embodiments, sulfur-polyaniline (S-Pani) core-shell and yolk-shell nanoarchitectures for nanoparticles were prepared, tested, and compared. The two nanoarchitectures exhibited different cycling stability, especially in prolonged cycling performance. The yolk-shell nanocomposite was prepared through a heating treatment of the core-shell nanocomposite and was found to provide higher capacity retention, owing to its unique morphology that encapsulated the sulfur inside the polymer shell with a buffer void space. An advantage of yolk-shell structures lies in the presence of the internal void space to accommodate the volumetric expansion of sulfur during lithiation, thus preserving the structural integrity of the shell while minimizing polysulfide dissolution. With the help of this yolk-shell structure, the capacity of Li/S batteries could be stabilized at 765 mAh g$^{-1}$ at 0.2 C and 628 mAh g$^{-1}$ at 0.5 C after 200 cycles.

Figure 2:
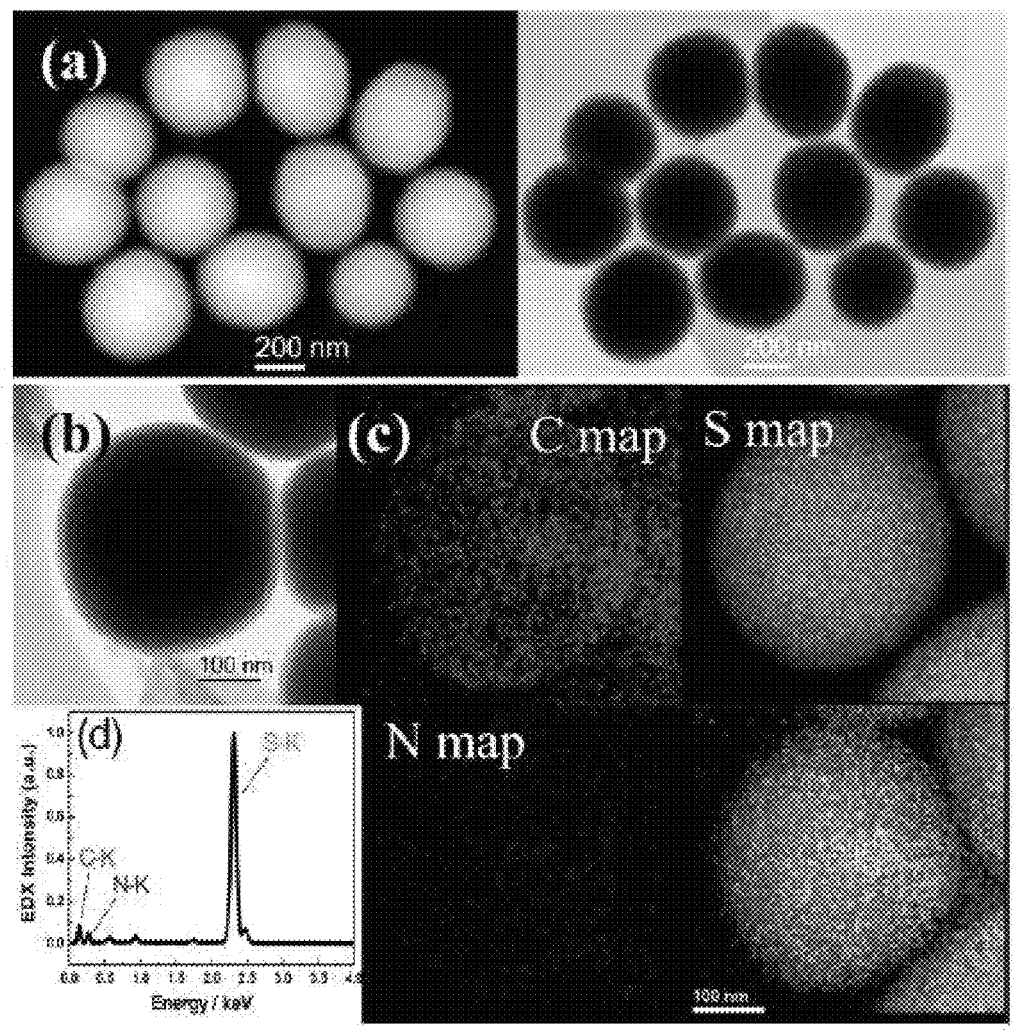
FIG. 2 shows: (a) HAADF- and BF-STEM images of S-Pani core-shell structure; (b) magnified image of a single S-Pani core-shell particle; (c) the corresponding EDX elemental mapping of carbon, sulfur, and nitrogen, along with an overlay of those three maps, showing the enrichment of carbon and nitrogen on the shell; and (d) EDX spectrum of S-Pani core-shell composite.
Figure 9:
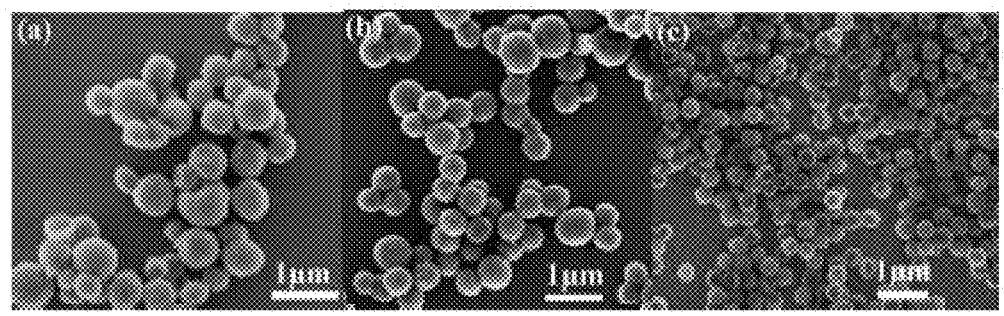
FIG. 9 shows SEM images of S-Pani core-shell structures prepared using HCl (a), HCOOH (b) and $H_2SO_4$ (c) as the acid sources.
Figure 10:
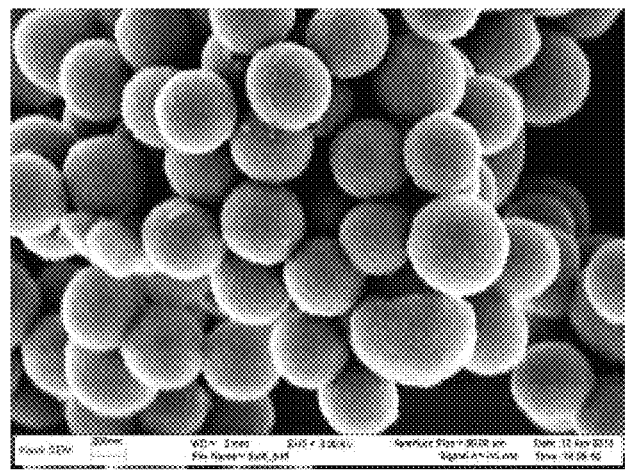
FIG. 10 shows a magnified SEM image of the S-Pani core-shell structure.
Figure 11:
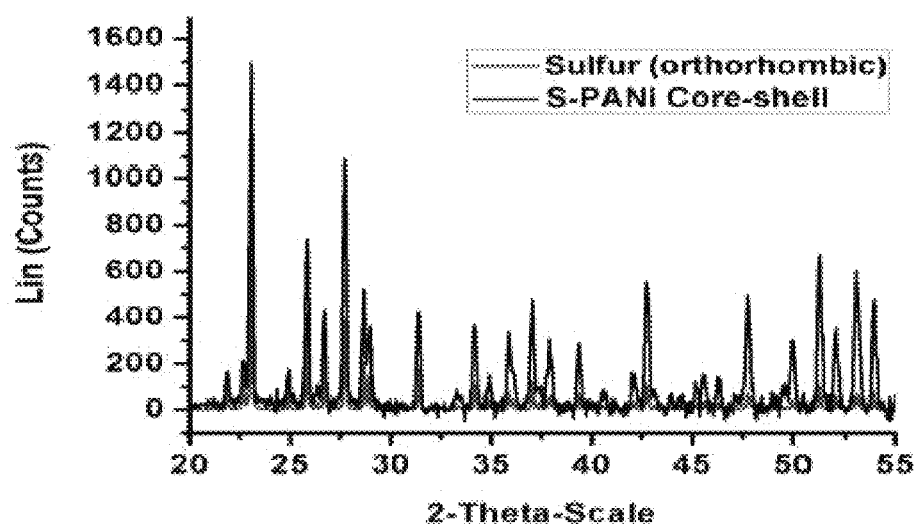
FIG. 11 shows an X-ray diffraction (XRD) of S-Pani composite shows it matches PDF card of pure sulfur(orthorhombic) since polyaniline (PAN) is amorphous. X-Ray Diffraction (XRD) data were collected using the D8-Advance DaVinci system with the Bragg-Brentano geometry and Cu Kα radiation (40 kV and 40 mA). The samples were prepared conservatively on quartz discs. Scans range from 10°-90° with fixed sample illumination and a 0.04°/s step size and 1 s/step rate with variable rotation at 15 rpm.
Figure 12:
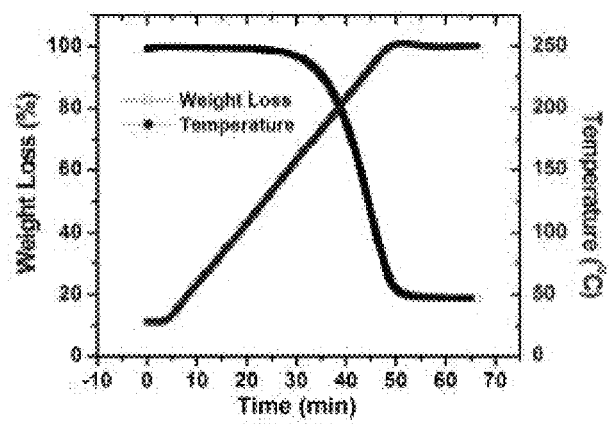
FIG. 12 shows a thermal gravimetric analysis (TGA) of the S-Pani core-shell composite in argon flow.

An S-Pani core-shell structure was synthesized as shown in FIG. 1a. First, monodispersed sulfur nanoparticles were prepared through the reaction of sodium thiosulfate with acid (HCl, HCOOH, and H$_2$SO$_4$ were tested) in the presence of 1% (weight ratio) polyvinylpyrrolidone (PVP, M$_w$ about 40,000). The freshly prepared sulfur particles were then dispersed in an aqueous solution of aniline and diluted sulfuric acid under strong stirring. The polyaniline-coated sulfur could be obtained through oxidation with ammonium persulphate at 0° C. for 24 h. The scanning electron microscopy (SEM) image in FIG. 1b shows uniform spherical nanoparticles prepared using H$_2$SO$_4$ as an acid source, with an average diameter of ≈348±20 nm. When HCl and HCOOH were employed as the acid sources, the obtained nanoparticles showed not only larger nanoparticles, but also non-uniform nanoparticles, as shown in FIG. 9. Comparisons of maximum particle size obtained in the presence of 1% PVP show the following order: H$_2$SO$_4$<HCOOH<HCl. The surface of S-Pani particles appears to be very rough, with many nanoparticles protruding on the surface, as illustrated in FIG. 10, which can be attributed to the cross aggregation of polyaniline chains. The high angle annular dark field and bright field scanning transmission electron microscopy (HAADF-STEM and BFSTEM) images indicated that sulfur nanoparticles were uniformly encapsulated inside the polyaniline shell. From the contrast variation as illustrated in FIG. 2a and FIG. 2b, the polyaniline shell was measured to be about 15 nm, whereas the sulfur core was about 300 nm. Energy dispersive X-ray (EDX) elemental mapping confirmed that the core of the particle in FIG. 2b was sulfur, along with overlaying carbon and nitrogen signals from coating polyaniline shell as illustrated in FIG. 2c. The EDX spectrum displayed a very strong sulfur peak, which was over 10-fold higher in peak intensity relative to carbon, as shown in FIG. 2d. The X-ray diffraction (XRD) data of this S-Pani core-shell structure only gave the well-matched signals of orthorhombic sulfur (i.e., lighter shaded gray), as shown in FIG. 11, indicating that the polyaniline was amorphous. Thermogravimetric analysis (TGA) showed that about 82 wt % of sulfur was incorporated in the S-Pani composite, as illustrated in FIG. 12. Compared with recent reports on the polymer-coated sulfur composites with a particle diameter of over 1 μm, the sulfur particles' diameter of 300 nm in this study was much smaller, which would facilitate both the ionic transportation of Li$^+$ and the electrochemical availability efficiency of sulfur, owing to the poor conductivity of sulfur.

Prepared were cells in which the S-Pani core-shell composite was used as the cathode and lithium foil was used as the anode. Additionally, 1.0 M lithium bis-trifluoromethanesulfonylimide (LiTFSI) in a mixed solvent of 1, 3-dioxolane and 1, 2-dimethoxyethane (DOL/DME, 1:1, v/v) containing LiNO$_3$ (1 wt %) was used as the electrolyte. S-Pani was mixed with carbon black (Super P) and water-soluble binder sodium alginate (80:15:5 by weight) to prepare the cathode film. Here, water-soluble binder was employed to avoid unwanted dissolution of sulfur or even the damage of the nanostructures. As shown in FIG. 3a, two well-defined discharge plateaus were observed, which could be assigned to a multistep reduction mechanism of elemental sulfur. The first plateau, centered around 2.35 V, was generally attributed to the reduction of the S$_8$ ring and the formation of S$_8^{2-}$. The discharge plateau at 2.08 V was ascribed to the further reduction of the higher polysulfides (Li$_2$S$_n$, 4≤n≤8) to the lower polysulfides (Li$_2$S$_n$, n≤3). Within the first 20 cycles, the capacity showed clear fading with cycling, followed by a relatively stable capacity from the 20th to the 50th cycle. These features were similar to the previous reports, where only the first 50 cycles were presented. In longer cycling, the capacity dropped heavily from 510 to 280 mAh g$^{-1}$ after 125 cycles, indicating that the core-shell structure was not effective in preventing the long-term loss of sulfur into the electrolyte during the redox processes. In comparison, a control electrode based on pure sulfur suffered from a much faster capacity fade, yielding a capacity of only 124 mAh g$^{-1}$ after 125 cycles. These results indicate that although the core-shell structure provided a protective coating, its integrity is not preserved during the volumetric expansion, and polysulfides eventually escape during the discharge process. The SEM image of the S-Pani core-shell composite after running five cycles in coin cells gave visualized evidence, in which around half of the particles were broken or shrunk, as illustrated in FIG. 3c and FIG. 3d. All these above results indicated that the polyaniline shell could not effectively accommodate the large volumetric expansion during the lithiation process, especially in the long-term and repeating discharge-charge processes.

Figure 4:
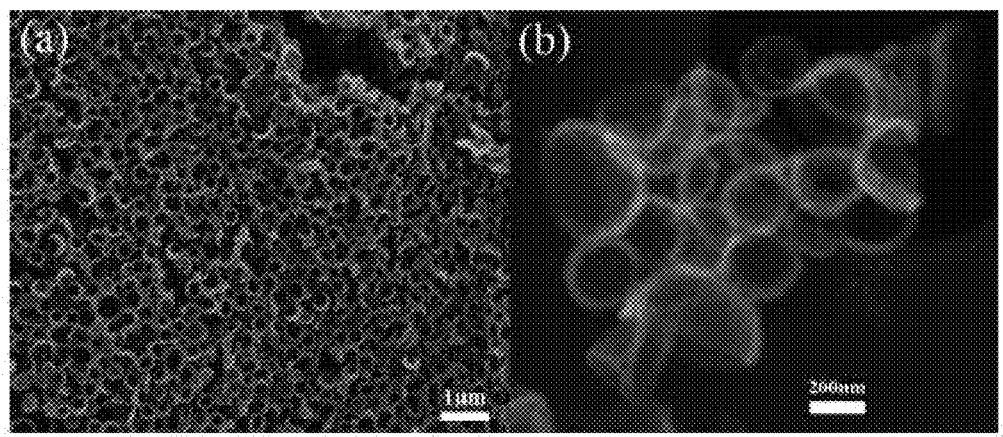
FIG. 4 shows: (a) SEM and (b) HAADF-STEM images of S-Pani core-shell structure after leaching in toluene/ethanol.

In order to provide more space to allow for the volume expansion of sulfur particles during lithiation, it is desirable to develop a S-Pani yolk-shell nanocomposite with polyaniline shells and tunable buffer voids. In this respect, the strategy of leaching sulfur out of the core-shell structures through partial dissolution of sulfur in toluene has been reported. However, if the toluene can leach out the sulfur, it is also plausible that the electrolyte solvent DOL/DME could leach out the polysulfides during the discharge-charge process. To verify this, one may try to prepare the S-Pani yolk-shell nanocomposites by leaching them with a toluene/ethanol co-solvent mixture. As predicted, all of the core-shell structures were broken and resulting half-bowl structures were observed, as shown in images of the FIG. 4a. The STEM image showed that there was almost no sulfur left in the half-bowl structures as illustrated in FIG. 4b, which indicates that nanosize sulfur was easily dissolved under these conditions, and the polyaniline shells were subsequently collapsed.

From recent studies on polyaniline-doped sulfur for Li/S electrode composites, polyaniline could react with sulfur at high temperature to form a cross-linked structure, which significantly improved the cycling performance. With this knowledge in mind, the S-Pani core-shell composites were heated at 180° C. in a sealed tube filled with argon for 12 h, with the expectation that elemental sulfur would react with polyaniline shell to form a three-dimensional, cross-linked S-Pani yolk-shell structure with both inter-chain and/or intra-chain sulfide and/or disulfide bonds interconnection through in situ vulcanization. Such a S-Pani yolk-shell structure could potentially help to provide buffer void space for the volumetric expansion of the polysulfides during lithiation and physically confine the elemental sulfur and the polysulfides.

Figure 5:
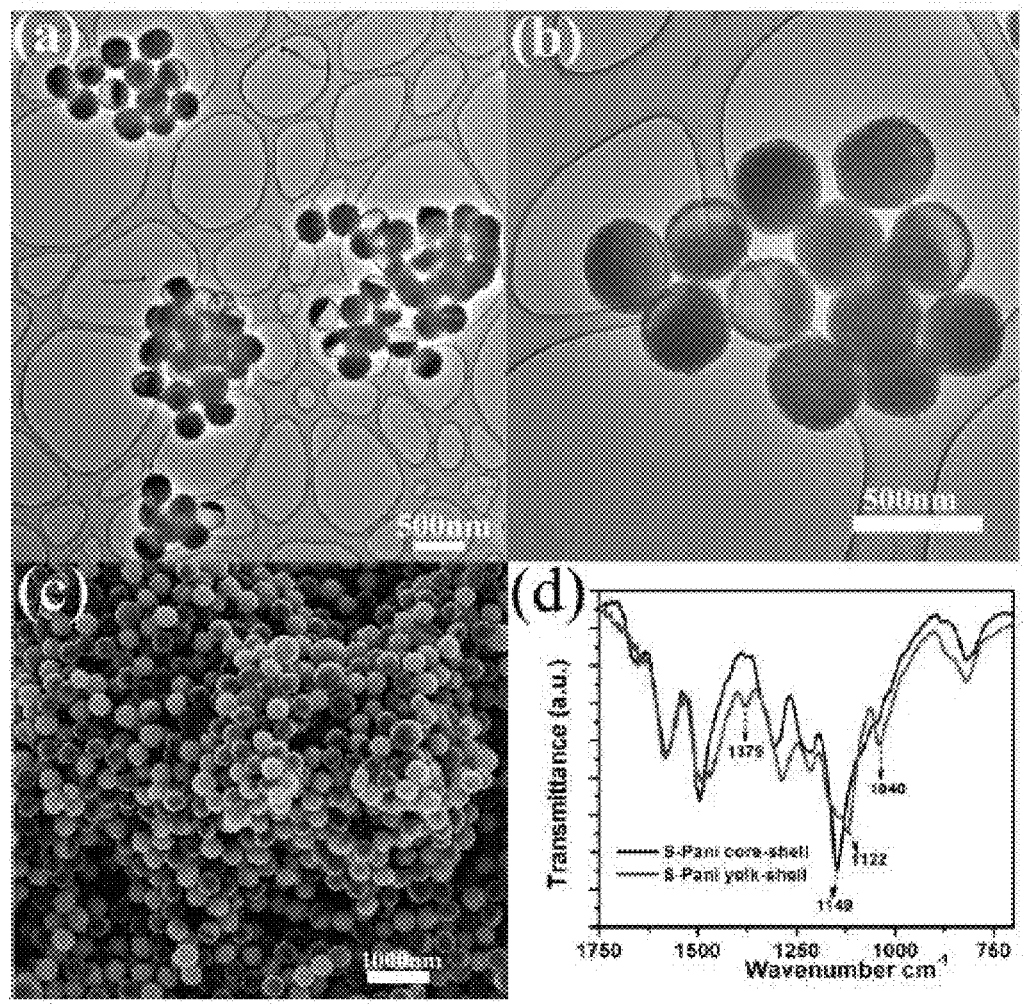
FIG. 5 shows: (a) large-scale TEM image; (b) magnified TEM image; and (c) SEM image of S-Pani yolk-shell structures after heat treatment. (d) FTIR spectra of S-Pani core-shell and yolk-shell structures.
Figure 13:
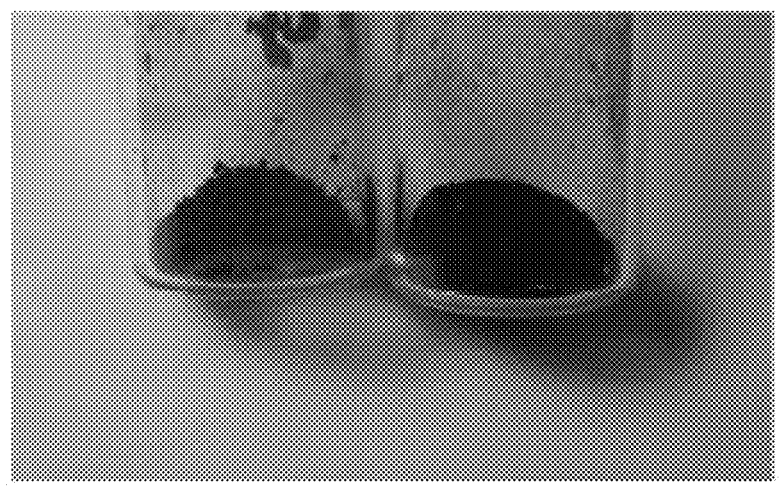
FIG. 13 shows an image of S-Pani core-shell(left) and heat treated yolk-shell(right) composite.
Figure 14:
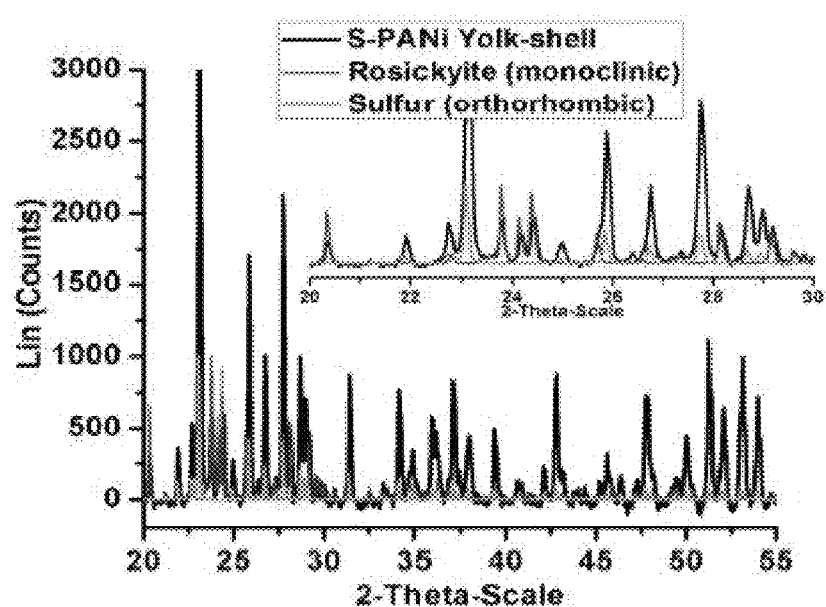
FIG. 14 shows an XRD of S-Pani yolk-shell composite shows it matches the combine of the pure sulfur (orthorhombic) with PDF card of 04-012-7311 and Rosickyite (monoclinic) with PDF card of 04-007-2069. Compared with the XRD spectra of S-Pani core-shell composite, the S-Pani yolk-shell composite gave obvious peaks at 20.36, 23.78, 24.13, 24.37, 28.13, 29.11, which are typical signals from Rosickyite (monoclinic).
Figure 15:
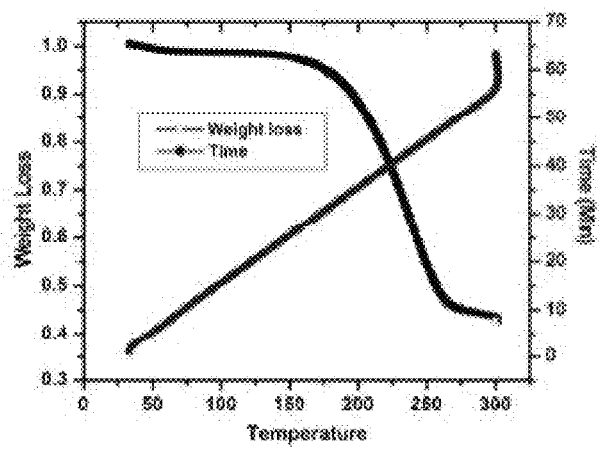
FIG. 15 shows a thermal gravimetric analysis (TGA) of the S-Pani yolk-shell composite in argon flow.

Transmission electron microscopy (TEM) and SEM images of S-Pani after heat treatment exhibited uniform yolk-shell structures without any broken shell, as shown in FIG. 5. The intact polymer shell was well-preserved, and partially hollowed yolk-shell structures of the S-Pani could clearly be observed. The void space appeared as either an empty area or lower intensity area due to the two-dimensional projection nature of the TEM images. The ability of sulfur vapor to diffuse out through the polyaniline shell indicates the porous nature of polyaniline shells, which can be ascribed to the cross aggregation of polyaniline chains. Unlike what the S-Pani core-shell structure did in the toluene/ethanol solvent, the polyaniline shell did not shrink with the diffusing out of the sulfur in the heating treatment, suggesting that the mechanical strength of polyanilne shell was enhanced during the heating vulcanization. It can be attributed to the cross-linked sulfide and/or disulfide bonds interconnection among polyaniline chains. To verify it experimentally, Fourier transformed infrared (FTIR) spectra of the S-Pani core-shell and heat-treated yolk-shell structures were recorded and shown in FIG. 5*d*. Both the C—C double bond stretching vibration at 1497 $cm^{-1}$ from the benzenoid rings and the C—N stretching vibrational bands at 1307 $cm^{-1}$ shifted to lower wave numbers, owing to the substitution of H atoms on benzenoid rings by S atoms. Three peaks at 1379, 1122, and 1040 $cm^{-1}$ arose in the heat-treated S-Pani yolk-shell composites, which could be assigned to the vibration of C—S. The intensity of the C—H vibrational band in the vicinity of 1149 $cm^{-1}$ significantly weakens, further confirming the replacement of H atoms on aromatic rings by S atoms. Furthermore, the heat-treated S-Pani yolk-shell composites showed a blacker color compared with the dark green of the S-Pani core-shell composites, as shown in FIG. 13. In contrast with the orthorhombic sulfur of the S-Pani core-shell composite, the XRD of heat-treated S-Pani yolk-shell composite indicated that it contained two types of sulfur, the sulfur (orthorhombic) and Rosickyite (monoclinic), as shown in FIG. 14. Rosickyite is a polymorph of sulfur and could be obtained through crystallization at high temperature. These features confirm that elemental sulfur reacted with the unsaturated bonds of polyaniline during the heat treatment through a well-known vulcanization reaction. The sulfur content was found to be about 58% in the heat-treated yolk-shell composites according to the TGA result in FIG. 15, which was around 46.4% in the whole electrode films, considering 20% of carbon black and binder. The formation of the yolk-shell structure could be attributed to the vulcanizing reaction and partial evaporation of the elemental sulfur during the heating treatment.

Figure 6:
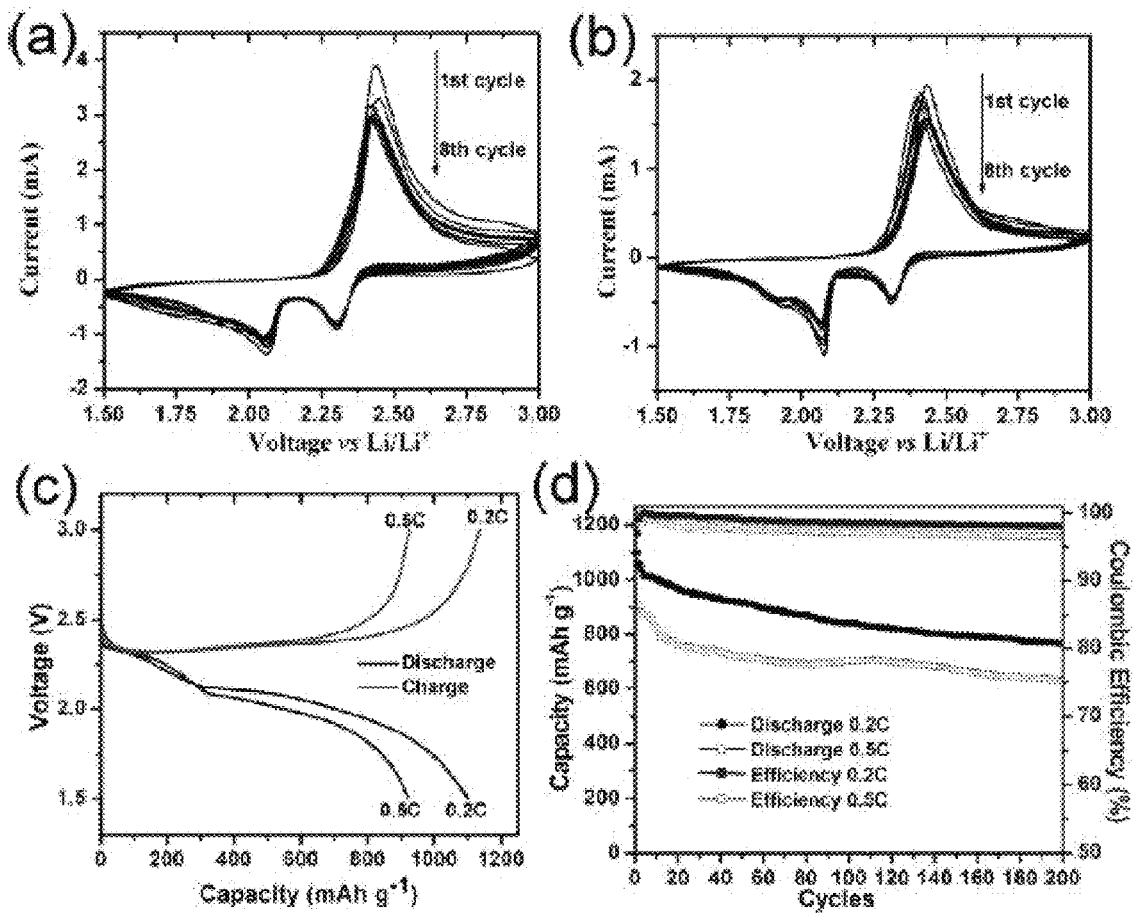
FIG. 6. shows typical CV curves of S-Pani yolk-shell cathode at a sweep rate of 0.05 mV s−1 (a) and 0.02 mV s−1 (b). Charge/discharge profiles and capacities vs cycle number for S-Pani yolk-shell composite cathodes at a rate of 0.2 C (c) and 0.5 C (d).
Figure 7:
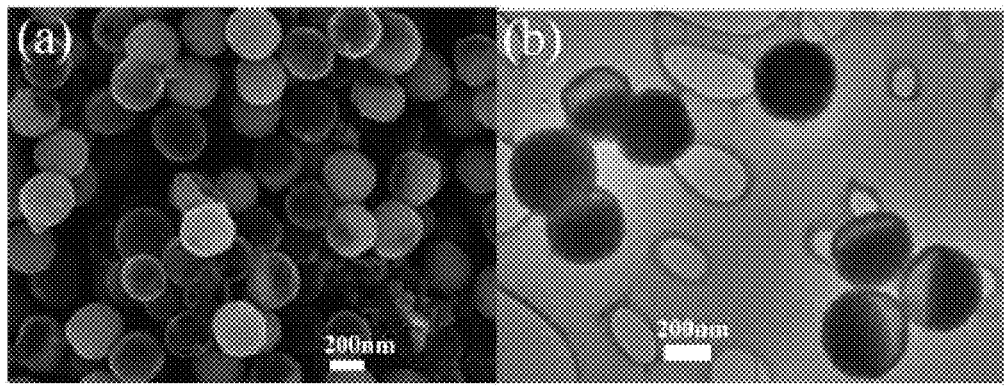
FIG. 7 shows the SEM (a) and TEM (b) images of S-Pani yolk-shell structures after the fifth charge in a coin cell. Small particles are the carbon black particles.

Cyclic voltammograms (CVs) of a Li/S cell with a heat treated S-Pani yolk-shell cathode were obtained at a scan rate of 0.05 and 0.02 mv $s^{-1}$ as illustrated in FIG. 6*a* and FIG. 6*b*. Two reduction peaks around 2.35 and 2.08 V were observed and could be assigned to the multistep reduction mechanism of elemental sulfur, as reported previously. Compared with typical CV curves of a Li/S cell, the reduction peak of the heat-treated S-Pani yolk-shell cathode at 2.08 V was a little smaller, and a shoulder centered at 1.9 V could be clearly observed, especially at a slow scan rate. Also, the reduction peak at 1.9 V could be observed in every reduction cycle of the CV curves from FIG. 6*a* and FIG. 6*b*, indicating that the reduction at 1.9 V was reproducible. This reduction peak could be attributed to the reduction of disulfide bonds connected with polyaniline through the vulcanization. FIG. 6*c* shows the discharge-charge profiles of coin cells using heat-treated S-Pani yolk-shell composites as the cathode materials at different current densities. Unlike the two clear discharge plateaus of the S-Pani core-shell composite electrode, two less-well-defined discharge plateaus centered around 2.35 and 2.08 V were observed for heat-treated S-Pani yolk-shell composites, which was in high agreement with the CV curves of FIG. 6*a*. As illustrated in FIG. 6*c*, the heat-treated S-Pani yolk-shell composites showed an initial capacity of 1101 and 920 mAh $g^{-1}$ under different current densities of 0.2 and 0.5 C, respectively. Although there was an initial capacity drop, the capacity tended to stabilize after about 10 cycles at both 0.2 and 0.5 C, as illustrated in FIG. 6*d*. Compared with the S-Pani core-shell electrode described earlier, the heat-treated yolk-shell composite electrode exhibited significantly improved capacity retention with cycling, which could be ascribed to the combined contributions from the buffer space and stabilized shell through vulcanization. After cycling for 200 cycles, a discharge capacity of 765 mAh $g^{-1}$ was obtained at 0.2 C, which corresponded to a 69.5% capacity retention. At a higher current density of 0.5 C, a stable cycling performance was observed with a capacity around 628 mAh $g^{-1}$ and a 68.3% capacity retention after running 200 cycles. The relatively lower cycling performance at 0.5 C can be attributed, at least in part, to the lower Coulombic efficiency at this current density. The improved cycling stability verifies that the yolk-shell structure can help to immobilize the polysulfides and mitigate capacity fading. To further investigate the stability of the yolk-shell structure during the cycling of coin cells, a cell was disassembled after running five cycles, and the composite was regained after rinsing with water. As shown in the FIG. 7, the intact polyaniline shells were still preserved, which suggests that the shell of vulcanized polyaniline can accommodate the volumetric expansion during the charge/discharge process. During the discharge process, the elemental sulfur was first reduced due to it is relatively higher reduction potential. With the reduction of elemental sulfur, that is, the lithiation process, the volume of the sulfur/sulfide species was increased to near twice, which will fill the void space within the shell. After that, the disulfide bonds among polyaniline chains were reduced, and the shell should not shrink much due to the volumetric increase of the inside sulfide species during lithiation. In a subsequent charge process, the sulfide anions on the polymer chains could be reoxidized to form disulfide again and recover the crosslinked polyaniline shell. Therefore, theoretically these processes should not destroy the yolk-shell structures. Experimentally, the CV curves gave a reproducible reduction shoulder at 1.9 V, which indicates that these processes were reversible. In addition, the SEM and TEM images of the yolk-shell structure after running five cycles gave visible evidence that the structure was well-preserved.

Figure 3:
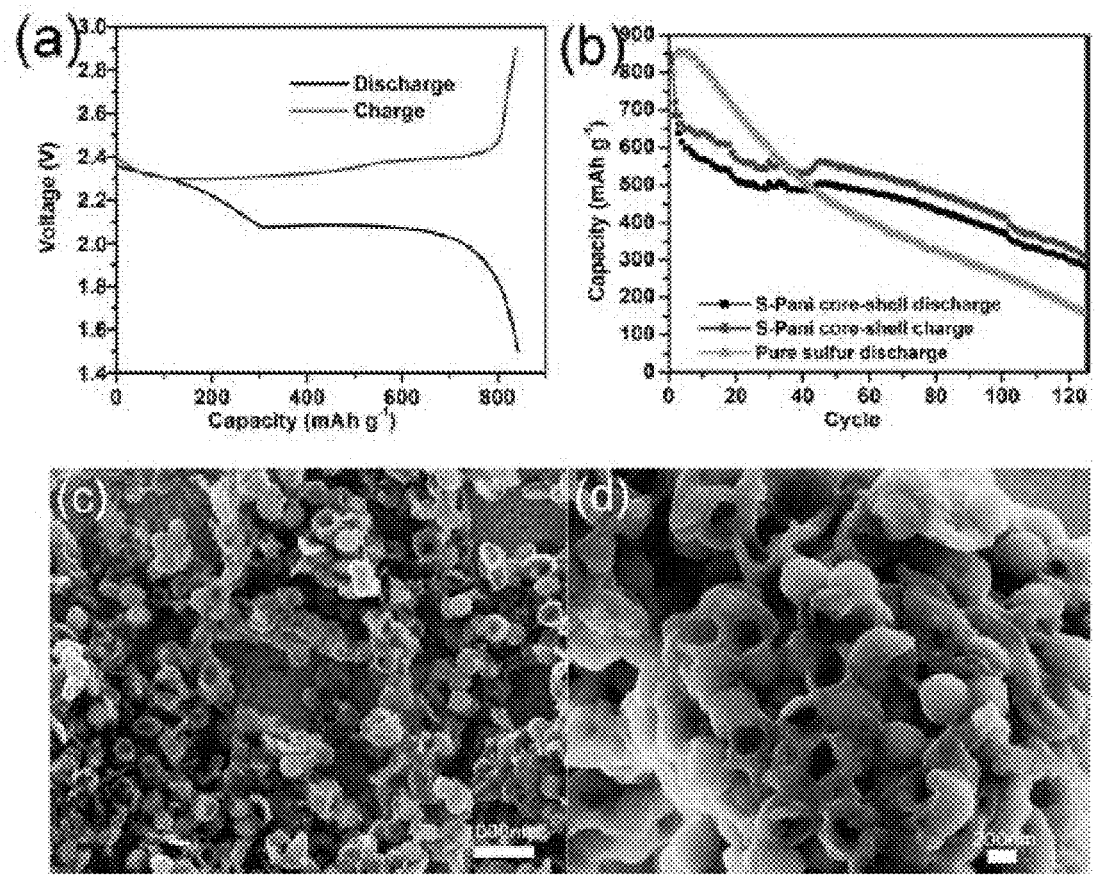
FIG. 3 shows: (a) charge/discharge profiles and (b) charge/discharge capacities vs cycle number for a S-Pani core-shell cathode at a rate of 0.2 C (1 C=1672 mA g−1). The capacity values were calculated on the basis of the mass of sulfur. Large scale (c) and magnified (d) SEM images of S-Pani core-shell composites after running five cycles in coin cells.
Figure 8:
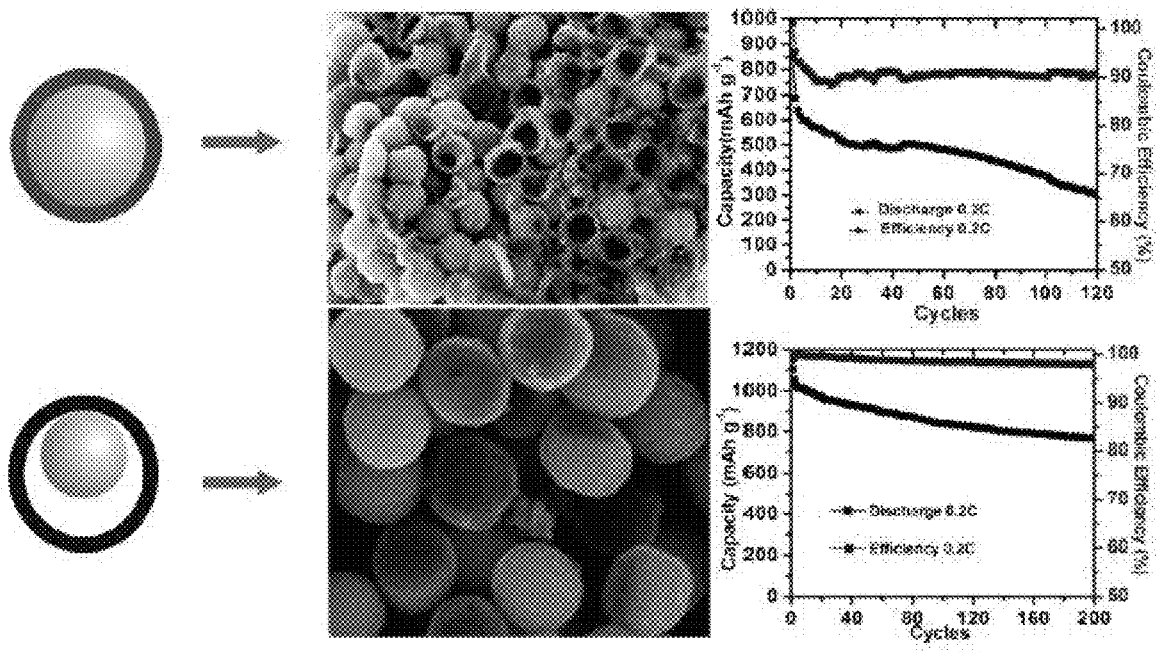
FIG. 8 shows a schematic comparison of the S-Pani core-shell and yolk-shell SEM images after running five cycles in cells and the long-term cycling performance.

The significantly improved cyclability could be ascribed to the sufficient buffer space in the yolk-shell structures, which allowed for the volume expansion of sulfur. After the heat treatment, the sulfur weight content dropped from 82 to 58%, as shown in the TGA data of FIG. 12 and FIG. 15, which indicated that more than ⅔ of the sulfur evaporated or reacted with the polyaniline shells based on the assumption that the weight of polyaniline did not change. Since the weight of polyaniline shells should actually increase by some degree during the vulcanization, the evaporated sulfur would be around or less than ⅔. These data indicate that the volume of empty space within the yolk-shell nanostructures was estimated to be around or near twice the sulfur, which would be enough to accommodate the 80% volumetric expansion during the discharge process without causing the shell to crack. Apparently, these values were supported by the TEM images of FIG. 5, in which more than half of the space within the shell was void. Experimentally, the integrity of polyaniline shells was still well-preserved after running five cycles in coin cells, as shown in FIG. 8, further confirming that the void buffer space of the yolk-shell structures successfully accommodated the volumetric expansion. By contrast, most polyaniline shells of the core-shell composite were cracked after running five cycles in coin cells, as shown in FIG. 3 and FIG. 8. All of these above features verified that internal void space in the yolk-shell nanostructures was sufficient to accommodate the volume expansion of polysulfides during lithiation, thus maintaining the intact shells to minimize the polysulfide dissolution and maximize the capacity retention. An observation that one might consider is that although this yolk-shell composite delivered much improved cycling stability compared with the core-shell composite, slow capacity degradation could still be observed. The efficiency was just around 97%~98%, which indicates that the dissolution of polysulfides and the subsequent shuttling effect still did not completely vanish in this condition. In addition, the sulfur ratio in the yolk-shell composite was only around 58%, which limited the overall capacity based on the yolk-shell composite. However, owing to the low cost of widely available polyaniline and the easily scaled-up heating process that could give uniform distribution of leaching percentage across the entire array of nanoparticles, it is potentially scalable for industry manufacturing.

In summary, polyaniline-coated sulfur with core-shell and yolk-shell structures have been prepared and investigated to immobilize lithium polysulfides as the cathodes of Li/S cells. Compared with the core-shell composite, the as-synthesized S-Pani yolk-shell composite delivered obviously improved cycling stability. The vulcanized soft polymer shells and yolk-shell structures developed in this study successfully encapsulated the sulfur and polysulfide species within the polymer shell and accommodated the volumetric expansion associated with the lithiation, owing to the presence of internal void space. While slight capacity fading was still observed, it is believed that these results provide important insights and novel methodology to confine the sulfur and polysulfides for the future application of Li/S batteries.

3. Experimental

Materials Synthesis $Na_2S_2O_3$ (2.37 g) in 50 ml water was slowly added into a dilute sulfuric acid solution (500 ml, 3 mM) containing 1% (weight ratio) of polyvinylpyrrolidone (PVP, $M_w \approx 40,000$). After stirring for 2 hours at room temperature, the sulfur particles were collected by centrifugation and re-dispersed into 300 ml aqueous solution of PVP (1%). 200 mg aniline and 10 ml sulfuric acid (1M) were added into the above emulsion. 0.5 g ammonium persulphate in 30 ml water was then added dropwise under a nitrogen flow at 0 C. After stirring at 0 C for 24 hours, the polyaniline coated sulfur particles were collected by centrifugation and dried under vacuum overnight. To prepare the sulfur-polyaniline yolk-shell structures, the powder of the core-shell particles was sealed into a glass tube filled with argon and heated to 180 C for 12 hours.

Electrochemical Measurements

To prepare the cathodes, sulfur based materials were first mixed with carbon black and water soluble binder sodium alginate (80:15:5 by weight) through ground in a mortar. The mixture was then spread evenly on the aluminum foil and roll-pressed to produce electrode films with an average sulfur loading of 2 mg cm$^{-2}$, which were heated at 500 C for 12 hours under vacuum before using to fabricate the coin cells. 2032 type coin cells were fabricated in an argon filled glove box using lithium foil as the anode and TFSI (1M in DOL/DME) containing $LiNO_3$ (1 wt %) as the electrolyte. The sulfur contents of S-Pani core-shell and yolk-shell in the cathode films were calculated to be 65.6% and 46.4%, respectively.

Material Characterization

Electron microscopy imaging was carried out using a Schottky field-emission-gun Tecnai F20 scanning transmission electron microscope (STEM) operated at 200 keV. The energy dispersive x-ray (EDX) analysis was performed in the same apparatus F20 using an Oxford detector, at a beam current of about 1 nA. An EDX resolution of 1-5 nm is routinely achieved on this setup. Sulfur was not found to sublime into vacuum within the electron microscope under the testing conditions, likely due to the core-shell or yolk-shell structure, which protects sulfur against sublimation.

All references, including publications, patent applications, and patents cited herein are hereby incorporated by reference in their entireties to the same extent as if each reference was individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein (i.e., which are intended to have a relative uncertainty of 10% unless clearly otherwise indicated) are merely intended to serve as a shorthand method of referring individually to each separate value falling within the range, unless otherwise indicated herein, and each separate value is incorporated into the specification as if it was individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A method of making a yolk shell sulfur nanoparticle, the method comprising:
   providing a sulfur nanoparticle;
   coating the sulfur nanoparticle with a polymer to produce a core-shell nanoparticle comprising a sulfur core and a polymer shell; and heating the core-shell nanoparticle such that a portion of the sulfur core is removed and the polymer shell is concomitantly vulcanized.

2. The method of claim 1, wherein the polymer is an electronically conductive polymer.

3. The method of claim 2, wherein the electronically conducting polymer comprises polyaniline.

4. The method of claim 1, wherein the step of coating the sulfur nanoparticle with a polymer comprises polymerizing a monomer in the presence of the sulfur nanoparticle.

5. The method of claim 4, wherein the monomer comprises aniline.

6. The method of claim 4, wherein the step of polymerizing comprises contacting the monomer with an oxidant.

7. The method of claim 1, wherein the step of providing a sulfur nanoparticle comprises decomposing thiosulfate anions in the presence of an acid.

8. The method of claim 1, wherein the step of heating the core-shell nanoparticle comprises treating the core shell nanoparticle at approximately 150 to 200° C.

9. The method of claim 1, wherein the step of heating the core-shell nanoparticle comprises treating the core shell nanoparticle for approximately 6 to 18 hours.

10. The method of claim 1, wherein the sulfur core comprises a sulfur material selected from the group consisting of elemental sulfur, $S_8$, $Li_2S_n$, and other polysulfides.

11. The method of claim 1, wherein the vulcanized polymer shell comprises a permeable, sulfur-functionalized organic polymer shell, and wherein the polymer is cross-linked by sulfide, disulfide, or a combination thereof.

12. The method of claim 11, wherein the permeable, sulfur-functionalized organic polymer shell is permeable to vapors, or to ions including lithium ions, or to a combination thereof.

13. The method of claim 1, wherein the sulfur core has a diameter from about 200 to about 300 nanometers, and the polymer shell has a a thickness from about 10 to about 20 nanometers.

14. The method of claim 1, wherein the yolk shell nanoparticle comprises a void space within the vulcanized polymer shell.

15. The method of claim 14, wherein the void space is interposed between the sulfur core and the polymer shell.

16. The method of claim 14, wherein the void space comprises from about 25 to about 75 percent of a volume enclosed by the polymer shell.

17. A method of making an electrode, the method comprising:
providing a conductive substrate;
coating at least a portion of the conductive substrate with a yolk shell sulfur nanoparticle, the yolk shell sulfur nanoparticle comprising a sulfur core and a permeable organic polymer shell surrounding the sulfur core, wherein the polymer of the polymer shell is cross-linked by sulfide, disulfide, or a combination thereof.

18. The method of claim 16, wherein the polymer comprises polyaniline.

19. The method of claim 16, wherein the sulfur core comprises a sulfur material selected from the group consisting of elemental sulfur, $S_8$, $Li_2S_n$, and other polysulfides.

20. The method of claim 16, wherein the permeable organic polymer shell is permeable to vapors, or to ions including lithium ions, or to a combination thereof.

21. The method of claim 16, wherein the sulfur core has a diameter from about 200 to about 300 nanometers, and the polymer shell has a thickness from about 10 to about 20 nanometers.

22. The method of claim 16, wherein the yolk shell nanoparticle comprises a void space within the vulcanized polymer shell.

23. The method of claim 22, wherein the void space comprises from about 25 to about 75 percent of a volume enclosed by the polymer shell.

24. The method of claim 16, further comprising the step of making the yolk shell sulfur nanoparticle, comprising:
providing a sulfur nanoparticle;
coating the sulfur nanoparticle with the polymer to produce a core-shell nanoparticle comprising the sulfur core and the polymer shell; and
heating the core-shell nanoparticle such that a portion of the sulfur core is removed and the polymer shell is concomitantly vulcanized.

25. A method of making a battery comprising an electrode, comprising:
providing a conductive substrate;
coating at least a portion of the conductive substrate with a yolk shell sulfur nanoparticle, the yolk shell sulfur nanoparticle comprising a sulfur core and a permeable organic polymer shell surrounding the sulfur core, wherein the polymer of the polymer shell is cross-linked by sulfide, disulfide, or a combination thereof.

26. The method of claim 25, wherein the battery comprises a Li/S battery.

27. The method of claim 25, wherein the polymer comprises polyaniline.

28. The method of claim 25, wherein the sulfur core comprises a sulfur material selected from the group consisting of elemental sulfur, $S_8$, $Li_2S_n$, and other polysulfides.

29. The method of claim 25, wherein the permeable organic polymer shell is permeable to vapors, or to ions including lithium ions, or to a combination thereof.

30. The method of claim 25, wherein the sulfur core has a diameter from about 200 to about 300 nanometers, and the polymer shell has a a thickness from about 10 to about 20 nanometers.

31. The method of claim 25, wherein the yolk shell nanoparticle comprises a void space interposed between the sulfur core and the permeable organic polymer shell surrounding the sulfur core.

32. The method of claim 31, wherein the void space comprises from about 25 to about 75 percent of a volume enclosed by the polymer shell.

33. The method of claim 25, further comprising the step of making the yolk shell sulfur nanoparticle, comprising:
providing a sulfur nanoparticle;
coating the sulfur nanoparticle with the polymer to produce the core-shell nanoparticle comprising the sulfur core and the polymer shell; and
heating the core-shell nanoparticle such that a portion of the sulfur core is removed and the polymer shell is concomitantly vulcanized.

34. The method of claim 25, wherein the battery has a capacity retention after 200 cycles of at least approximately 68% of its initial capacity.

35. The method of claim 25, wherein the battery retains a capacity of at least approximately 765 mAh $g^{-1}S$ at 0.2 C after 200 cycles.

36. The method of claim 25, wherein the battery retains a capacity of at least approximately 628 mAh $g^{-1}S$ at 0.5 C after 200 cycles.

* * * * *